United States Patent [19]
Hedlund

[11] Patent Number: 4,734,908
[45] Date of Patent: Mar. 29, 1988

[54] HIGH SPEED TRUNK INTERFACE WITH CONCURRENT PROTOCOL HANDLERS

[75] Inventor: Kurt A. Hedlund, Chicago, Ill.

[73] Assignee: American Telephone and Telegraph Company, AT&T Bell Laboratories, Murray Hill, N.J.

[21] Appl. No.: 926,012

[22] Filed: Oct. 31, 1986

[51] Int. Cl.[4] .......................................... H04Q 11/04
[52] U.S. Cl. ........................................ 370/60; 370/94
[58] Field of Search ..................................... 370/60, 94

[56] References Cited

U.S. PATENT DOCUMENTS

| | | | |
|---|---|---|---|
| 4,227,075 | 10/1980 | Holland | 370/4 |
| 4,412,326 | 10/1983 | Limb | 370/85 |
| 4,700,340 | 10/1987 | Beranek et al. | 370/60 |

*Primary Examiner*—Douglas W. Olms
*Assistant Examiner*—James E. Busch
*Attorney, Agent, or Firm*—John C. Moran

[57] ABSTRACT

A digital trunk interface utilizing the first protocol handler to signal the start of a packet and a second protocol handler responsive to the packet delayed to initiate the storage of the packet internally to the digital trunk interface. The digital trunk interface comprises a microprocessor and two universal synchronous asynchronous receiver transmitter (USART) circuits. One USART is directly connected to the incoming digital trunk and is utilized to inform the microprocessor when a packet is first received. The second USART receives the packet delayed by a predefined amount of time from the digital trunk. The microprocessor is responsive to the signal from the first USART that a packet has been received to perform the necessary administrative functions for receipt of the packet by the second USART.

12 Claims, 4 Drawing Figures

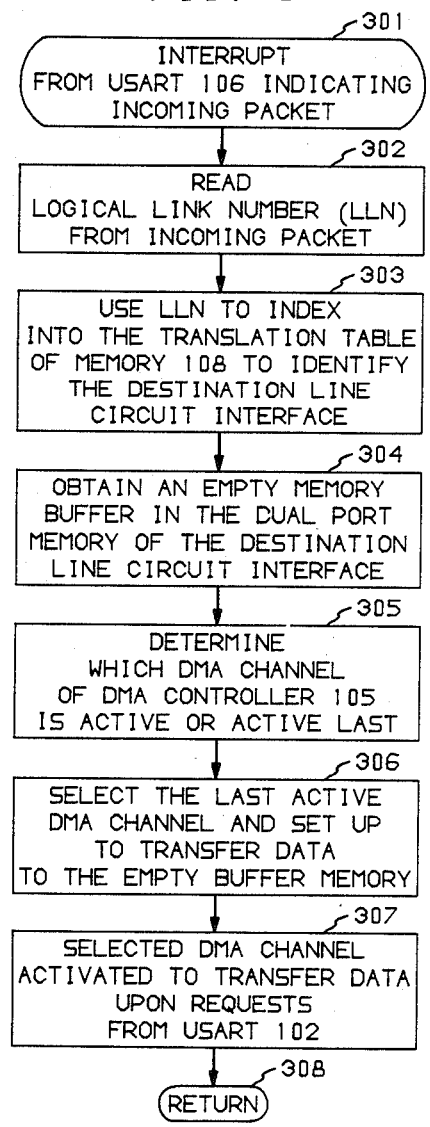

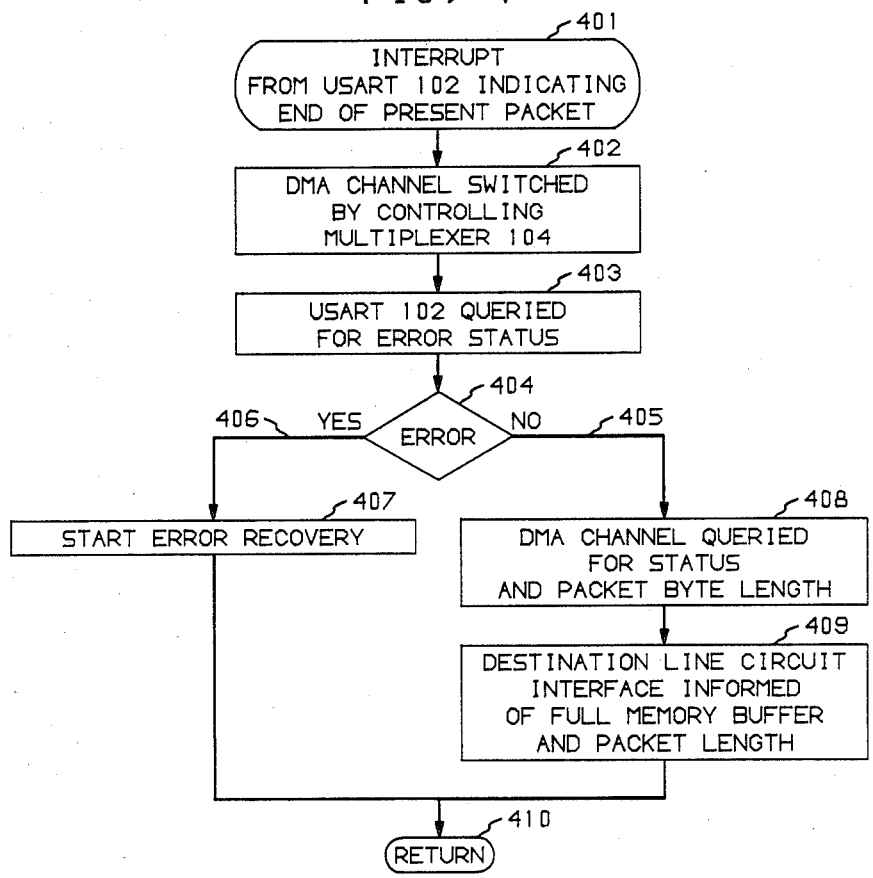

HIGH SPEED TRUNK INTERFACE WITH CONCURRENT PROTOCOL HANDLERS

TECHNICAL FIELD

My invention relates to packet switching and more particularly to a high speed trunk interface circuit for allowing a data access interface unit to be interconnected to a high speed packet switching network via a high speed trunk.

PROBLEM

It is desirable to interconnect data access interface (DAI) units to high speed packet switching networks such as described in U.S. Pat. No. 4,491,945 of J. S. Turner. DAI units statistically multiplex several digital data links interconnecting the DAI unit to customer terminals onto one high speed packet access link (PAL) or digital trunk. DAI units are well known and one such unit is described in U.S. Pat. No. 4,530,091 of J. Chu, et al. The DAI unit described in Chu attaches to a high speed trunk operating at 56 Kbs. However, the trunks which interconnect to the packet switching network disclosed in Turner must operate at 1.54 Mbs. It is known in the prior art to build trunk control interfaces/controllers to interface to trunks operating at such high speeds as 1.54 Mbs or greater; however, these trunk controllers have been designed using either custom very large scale integration (VLSI) or bit sliced microprocessors. One such trunk controller is disclosed in the aforementioned Turner patent. The problem with such trunk controllers is the cost and the complexity of design.

Protocol handlers exist in commercial intergrated circuit package form such as the Signetics, Inc. 68562 integrated circuit, universal synchronous asynchronous receiver transmitter (USART) and such protocol handlers are designed to work with commercial microprocessors and DMA controllers to handle a variety of protocol such as the popular X.25 protocol. Whereas, the commercially available USARTs are capable of operating at bit rates up to 4 Mbs, the problem arises in that packets arriving over a high speed digital trunk from a network such as described by Turner are often only separated by one or two flag characters. The result is that the microprocessor controlling the USART chip cannot respond to the end of one packet in sufficient time to set up a direct memory access, DMA, controller for the second packet. Hence an overrun of the DAI unit occurs at the high speed trunk interface. The reason for this overrun is that the microprocessor has certain administrative tasks to perform for the end of one packet and administrative tasks to perform before another packet can be received. These administrative tasks include such things as properly initializing the DMA controller and initiating and closing software buffers for the receipt and end of the packets.

SUMMARY OF THE INVENTION

The present invention solves the above described problems and deficiencies of the prior art and a technical advance is achieved by provision of a structural embodiment and method that include the concurrent use of two protocol handlers receiving information from the same high speed digital trunk with one of the protocol handlers being used to detect the start of a new packet and to signal a processor which then gathers the initial information necessary to perform administrative tasks for the receipt of the packet. The second protocol handler is responsive to the packet delayed by a fixed amount of time for communicating that packet through a direct memory controller to a customer interface facility.

Specifically, upon detecting the start of a new packet, the first protocol handler transmits an interrupt to a processor. The processor then performs the administrative tasks. In addition, the processor sets up the direct memory controller for the communication of the packet to a customer interface circuit designated by the information in the packet. When the second protocol handler has received the entire packet, it signals the processor via another interrupt. The processor is responsive to the other interrupt to perform the administrative tasks for a fully received packet which include informing the designated customer interface of the reception of the entire packet and the packet length.

BRIEF DESCRIPTION OF THE DRAWING

These and other advantages of the invention may be better understood from a reading of the following description taken in conjunction with the drawings in which:

FIG. 3 illustrates, in flow chart form, the program routine used to control processor 101 of FIG. 1 when a receipt of a new packet is detected by USART 106 of FIG. 1; and FIG. 4 illustrates, in flow chart form, the program routine used to control processor 101 of FIG. 1 when an entire packet has been received by USART 102 of FIG. 1.

DETAILED DESCRIPTION

Figure 1:
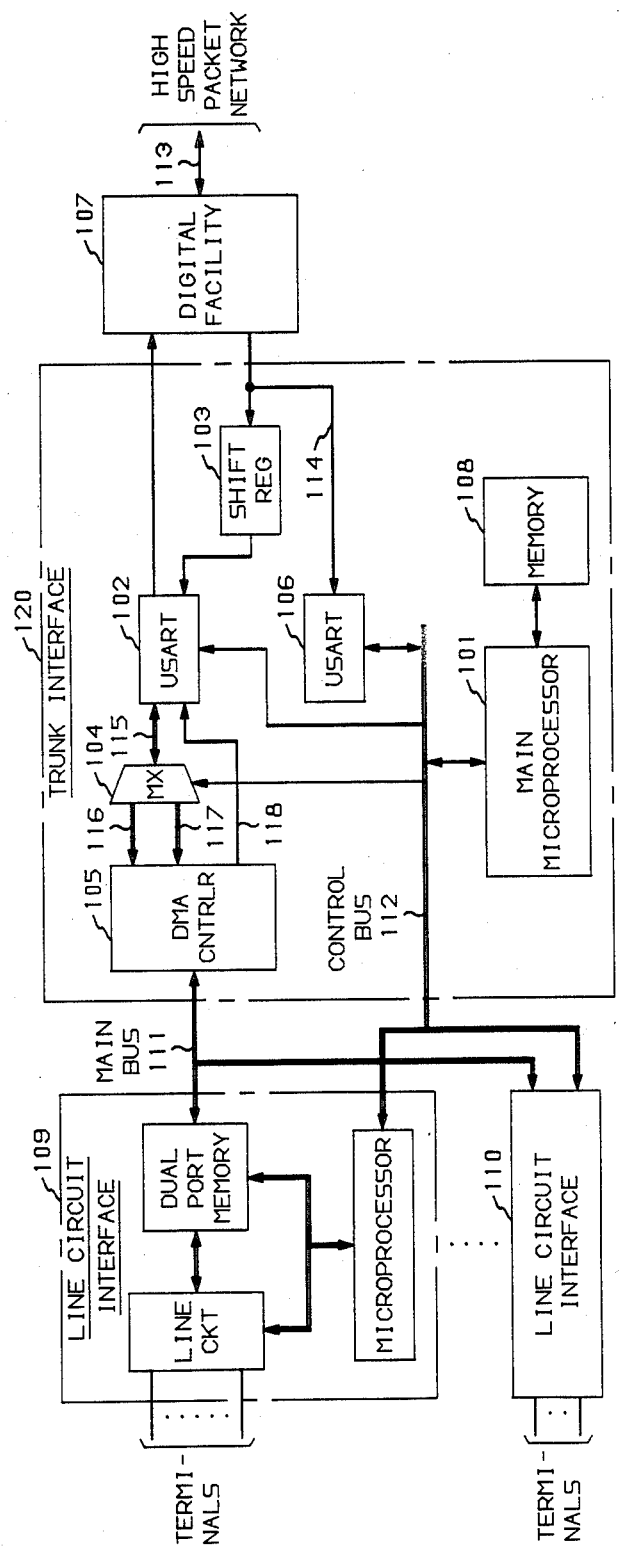
FIG. 1 discloses a system embodying the principles of the present invention.
Figure 2:
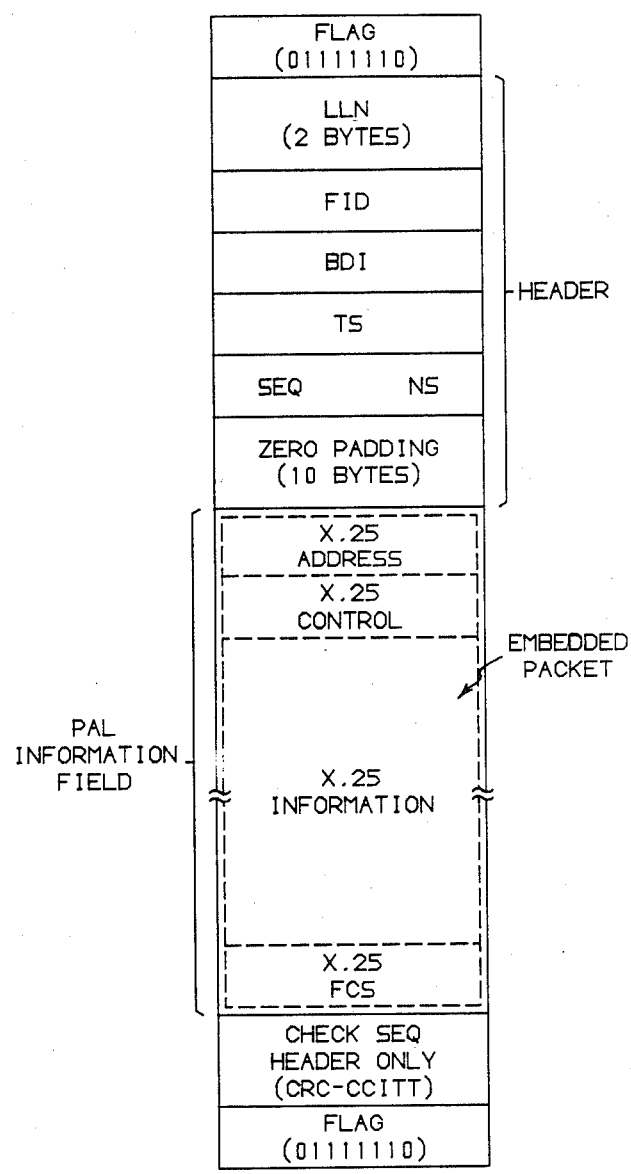
FIG. 2 illustrates the packet format used by packets of FIG. 1.

FIG. 1 illustrates a DAI unit which receives and transmits information from high speed digital trunk 113 to and from a plurality of terminals connected to line circuit interfaces 109 through 110 also commonly referred to as customer interface units. When a packet is received from the digital trunk 113, digital facility 107 recovers the digital data and clock using well known techniques in the art. Trunk interface 120 is then responsive to the recovered packet to determine for which line circuit interface the packet is intended. The information to make this determination is contained in the logical link number, LLN, field of the header of the packet illustrated in FIG. 2. The packet illustrated in FIG. 2 is of a well known format.

Trunk interface 120 functions in the following manner. All packets being received are stored via a DMA operation in a dual port memory of the line circuit interface designated by the LLN field of the packet illustrated in FIG. 2. Upon receipt of a new packet, main processor 101 must allocate a software buffer in the dual port memory designated by the LLN field, set up a DMA channel in DMA controller 105, initiate multiplexer 104, and set up USART 102. Microprocessor 101 also has to perform certain administrative tasks to close a software buffer utilized by the previous packet plus additional other functions after that packet has been entirely received. If microprocessor 101 only had the time between the present packet and the previous packet, there would be insufficient time for microprocessor 101 to react when the spacing between packets was only one or two flag characters. To enable microprocessor 101 to handle packets that are spaced close together, shift register 103 and USART 106 are utilized. Shift register 103 delays the packet data for advantageously 128 bits before the data actually has to be stored in a dual port memory via USART 102, multiplexer 104, and DMA controller 105. Microprocessor 101 receives immediate notification of the receipt of the new packet by USART 106 interrupting microprocessor 101 upon receipt of the header information of the new packet. The delay between when microprocessor 101 is notified of the receipt of the packet and the time when the packet must be stored in a dual port memory is sufficient to allow microprocessor 101 to perform the necessary administrative tasks.

Consider now in greater detail the operations performed by microprocessor 101 upon receipt of a new packet from trunk 113. When the new packet is transferred via bus 114 from digital facility 107 to USART 106 and shift register 103, USART 106 is responsive to the header of this packet to indicate a start of a new packet and cause an interrupt to microprocessor 101. The latter microprocessor is responsive to read the LLN field which is the first two bytes of the header from USART 106. Microprocessor 101 then interrogates the contents of the LLN field and determines which line circuit interface is to receive the new packet. Microprocessor 101 then utilizes a table stored in memory 108 to determine which data buffer is to be utilized in the designated line circuit interface's dual port memory. In addition, main processor 101 sets up a DMA channel in DMA controller 105 with the information to access the new data buffer. The previous packet is still being received by USART 102 and is using another previously setup data channel in DMA controller 105. When the previous packet is entirely received by USART 102 via shift register 103, main processor 101 controls multiplexor 104 via control bus 112 to select the output of USART 102 for communication to DMA controller 105 on either bus 116 or 117 depending on which bus corresponds to the DMA channel setup for the new packet. Control bus 112 communicates address, data, and control information. Main processor 101 had previously informed the microprocessor of the designated circuit interface via control bus 112 of the data buffer that was going to become active. After the data channel of DMA controller 105 has started to process the new packet, microprocessor 101 inactivates the previous data channel that had been used by the previous packet and performs the necessary administrative functions to close the data buffer associated with that DMA channel.

FIG. 3 illustrates, in flow chart form, the operations performed by microprocessor 101 when a new packet is received by USART 106. Upon receipt of a new packet, USART 106 causes an interrupt to microprocessor 101 via control bus 112. In response to this interrupt, microprocessor 101 executes the program of FIG. 3. In block 302, microprocessor reads the LLN field of the new packet from the USART 106. Based on the contents of the LLN field, microprocessor indexes into a translation table stored in memory 108 to identify the destination line circuit interface such as line circuit interface 109 through 110. After identifying the line circuit interface, microprocessor 101 executes block 304 and obtains an empty memory buffer from the new port memory of the destination line circuit interface via control bus 112. In obtaining the empty buffer, microprocessor 101 also performs the necessary administrative operations to inform the microprocessor of the line circuit interface that a memory buffer has been obtained and that a new packet is going to be placed into that memory buffer.

Next, microprocessor 101 executes block 305. By interrogating internal control memory locations within memory 108, microprocessor 101 determines which of the two DMA channels of DMA controller 105 is active or was last active. After making this determination, microprocessor 101 executes block 306. Block 306 results in microprocessor 101 setting up the last active DMA channel to transfer data from the new packet to the previously obtained empty memory buffer in the new port memory of the designated line circuit interface.

After setting up the DMA channel, microprocessor 101 executes block 307 to activate this channel for transferring data upon requests made by USART 102. These requests will be made by USART 102 when the new packet is received by the latter USART. Finally, microprocessor 101 executes block 308 which performs a return from the interrupt.

FIG. 4 illustrates, in flow chart form, the operations performed by microprocessor 101 upon receiving an interrupt from USART 102 indicating the end of the packet presently being received by the latter USART. First, microprocessor 101 executes block 402. The execution of block 402 results in multiplexer 104 transferring data to the other DMA channel of DMA controller 105 rather than the channel used for the previous packet. The reason for switching DMA channels is to allow the utilization of the DMA channel that had been selected and activated by blocks 306 and 307 of FIG. 3 for reception of a new packet.

Next, block 403 is executed by microprocessor 101. If an error has incurred in the transmission of the new packet, then decision block 404 transfers control via path 406 to block 407. When microprocessor 101 executes block 407, the error recovery process is initiated to perform well known error recovery operations. If no error was detected for the previous packet, decision block 404 transfers control via path 405 to block 408.

By executing block 408, microprocessor 108 obtains the status of USART 102 and the length of the previous packet. Microprocessor 101 then informs the microprocessor of the destination line circuit of the previous packet that the memory buffer is full and the packet length of the previous packet. Finally, microprocessor executes block 410 which results in a return from the interrupt.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A digital trunk interface for receiving a plurality of packets from a high speed digital trunk, comprising:
   a first protocol handler means responsive to the start of one of said packets for storing a subset of said one of said packets;

said first protocol handler means further responsive to said start of said one of said packets received from said trunk for transmitting an initialization signal;

means for delaying said one of said packets received from said trunk;

a second protocol handler means responsive to said delayed one of said packets for processing said delayed one of said packets; and means for controlling the communication of said delayed one of said packets from said second protocol handler in response to said initialization signal and said stored subset.

2. The digital trunk interface of claim 1 further comprises a memory means and the controlling means comprising means for directly storing said delayed one of said packets from said second protocol handler means into said memory means.

3. The digital trunk interface of claim 2 wherein said storing means comprises a plurality of channel means each having the capability for autonomously storing data from said second protocol handler means;

said controlling means further comprises means for initiating one of said autonomous channel means upon receipt of said initialization signal; and means responsive to receipt of said delayed one of said packets from said second protocol handler for transferring said delayed one of said packets to said initialized autonomous channel means.

4. An arrangement for receiving a plurality of packets from a high speed digital trunk, comprising:

a first protocol handler means responsive to the start of one of said packets for storing a subset of said one of said packets;

said first protocol handler means further responsive to said start of said one of said packets for transmitting an interrupt signal;

means for delaying said one of said packets from said trunk;

means for interfacing said arrangement to a plurality of customer terminals;

means for controlling the transfer of said delayed one of said packets to said interface means;

processor means responsive to said interrupt signal and said stored subset for controlling the transfer control means for facilitating the communication of said delayed one of said packets; and a second protocol handler means responsive to said delayed one of said packets for communicating said delayed one of said packets via said transfer control means to said interface means.

5. The apparatus of claim 4 wherein said one of said packets comprises a logical link number defining said interface means and said processor means comprises means responsive to said interrupt signal for reading said logical link number from said stored subset;

means for translating said logical link number; and means for initializing said transfer control means to communicate said delayed one of said packets in response to the translated logical link number.

6. The arrangement of claim 5 wherein said second protocol handler means is responsive to the end of said delayed one of said packets for generating another interrupt signal to said processor means;

said processor means further comprises means responsive to said other interrupt for reading the byte length of said delayed one of said packets from said second protocol handler means; and means for informing said interface means of the end of said delayed one of said packets and the read byte length.

7. A method for receiving a plurality of packets from a high-speed digital trunk by an arrangement comprising a first and second protocol handlers and a delay circuit and a controller, said method comprising the steps of:

storing a subset of one of said packets by said first protocol handler in response to the start of said one of said packets;

transmitting an initialization signal in further response to the start of said one of said packets by said first protocol handler;

delaying the communication of said one of said packets from said trunk to said second protocol handler for a predefined amount of time;

processing the delayed one of said packets by said second protocol handler; and controlling the communication of said delayed one of said packets from said second protocol handler by said controller in response to said initialization signal and said stored subset.

8. The method of claim 7 wherein said digital trunk interface further comprises a memory and said step of controlling comprises the step of directly storing said delayed one of said packets from said second protocol handler into said memory.

9. The method of claim 8 wherein said controller further comprises a plurality of channel means each having the capability for an autonomously storing data from said second protocol handler and said storing step comprises the steps of:

initiating one of said autonomous channels upon receipt of said initialization signal; and transferring said delayed one of said packets to said initialized autonomous channel upon receipt of said delayed one of said packets by said second protocol handler.

10. A method for receiving a plurality of packets from a high speed digital trunk by utilizing a digital trunk controller having a first and second protocol handler and a delay circuit and an interface circuit to a plurality of customer terminals and a control circuit and a processor, the method comprises the steps of:

storing a subset of one of said packets by said first protocol handler in response to the start of said one of said packets;

transmitting an interrupt signal by said first protocol handler in response to said start of said one of said packets;

delaying said one of said packets from said trunk by said delay circuit;

controlling the control circuit to facilitate the communication of said delayed one of said packets from said second protocol handler by said processor in response to said interrupt signal and said stored subset; and communicating said delayed one of said packets via said control circuit by said second protocol handler in response to said delayed one of said packets.

11. The method of claim 10 wherein said one of said packets comprises a logical link number defining said interface circuit and said controlling step comprises the steps of reading said logical link number by said processor in response to said interrupt signal;

translating said logical link number by said processor; and initializing said control circuit to communicate said delayed one of said packets by said processor in response to the translated logical link number.

12. The method of claim 11 further comprises the steps of:
generating another interrupt signal to said processor by said second protocol handler in response to the end of said delayed one of said packets;
reading the byte length of said delayed one of said packets from said second protocol handler by said processor in response to said other interrupt signal; and
informing said interface circuit of the end of said delayed one of said packets and said byte length of said delayed one of said packets by said processor.

* * * * *